Figures 1, 2, 3:
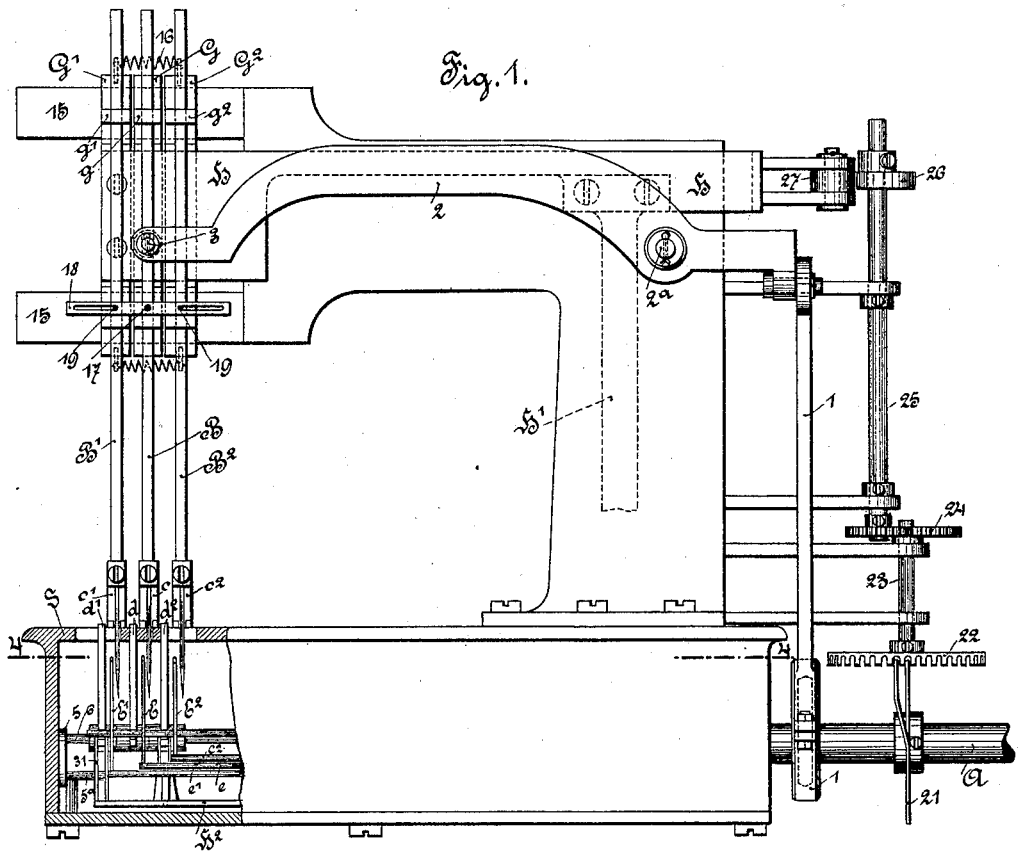

No. 609,887. Patented Aug. 30, 1898.
P. A. KÜHN & P. F. KLUGE.
MULTIPLE SEWING MACHINE.
(Application filed Aug. 20, 1896.)

(No Model.) 6 Sheets—Sheet 1.

Witnesses. Inventors:
Paul A. Kühn
Paul F. Kluge
by Church & Church
their Attys.

No. 609,887. Patented Aug. 30, 1898.
P. A. KÜHN & P. F. KLUGE.
MULTIPLE SEWING MACHINE.
(Application filed Aug. 20, 1896.)

(No Model.) 6 Sheets—Sheet 2.

No. 609,887. Patented Aug. 30, 1898.
P. A. KÜHN & P. F. KLUGE.
MULTIPLE SEWING MACHINE.
(Application filed Aug. 20, 1896.)
(No Model.) 6 Sheets—Sheet 3.

Witnesses.

Inventors:
Paul A. Kühn and
Paul F. Kluge.
by Church & Church
their attys.

No. 609,887. Patented Aug. 30, 1898.
P. A. KÜHN & P. F. KLUGE.
MULTIPLE SEWING MACHINE.
(Application filed Aug. 20, 1896.)
(No Model.) 6 Sheets—Sheet 4.
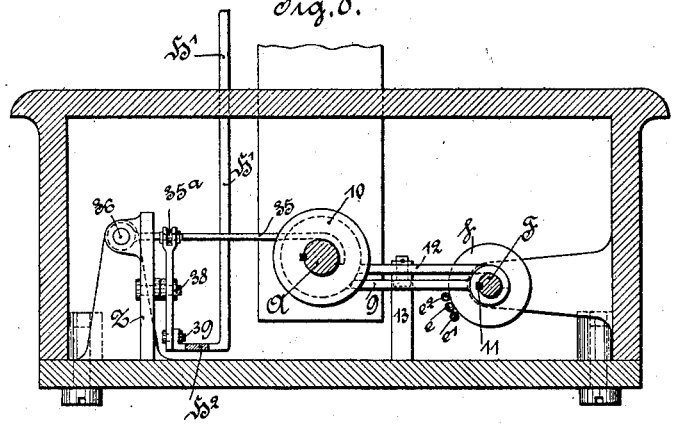
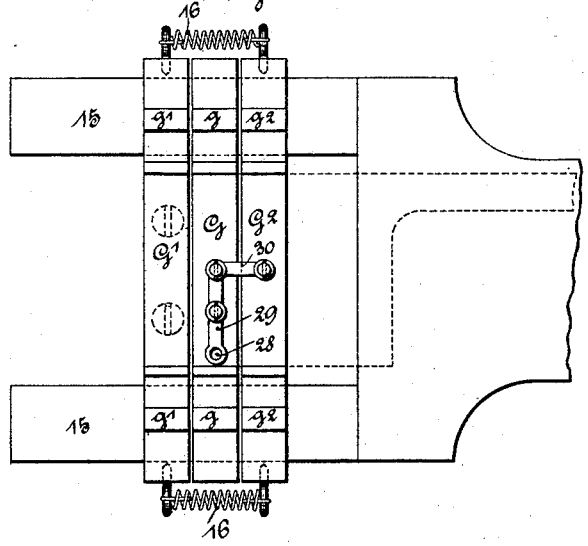
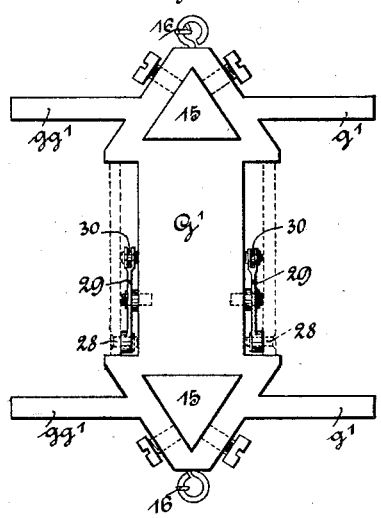

No. 609,887. Patented Aug. 30, 1898.
P. A. KÜHN & P. F. KLUGE.
MULTIPLE SEWING MACHINE.
(Application filed Aug. 20, 1896.)
(No Model.) 6 Sheets—Sheet 5.

Witnesses.

Inventors:
Paul A. Kühn and
Paul F. Kluge,
by Church & Church
their Attys

No. 609,887. Patented Aug. 30, 1898.
P. A. KÜHN & P. F. KLUGE.
MULTIPLE SEWING MACHINE.
(Application filed Aug. 20, 1896.)
(No Model.) 6 Sheets—Sheet 6.
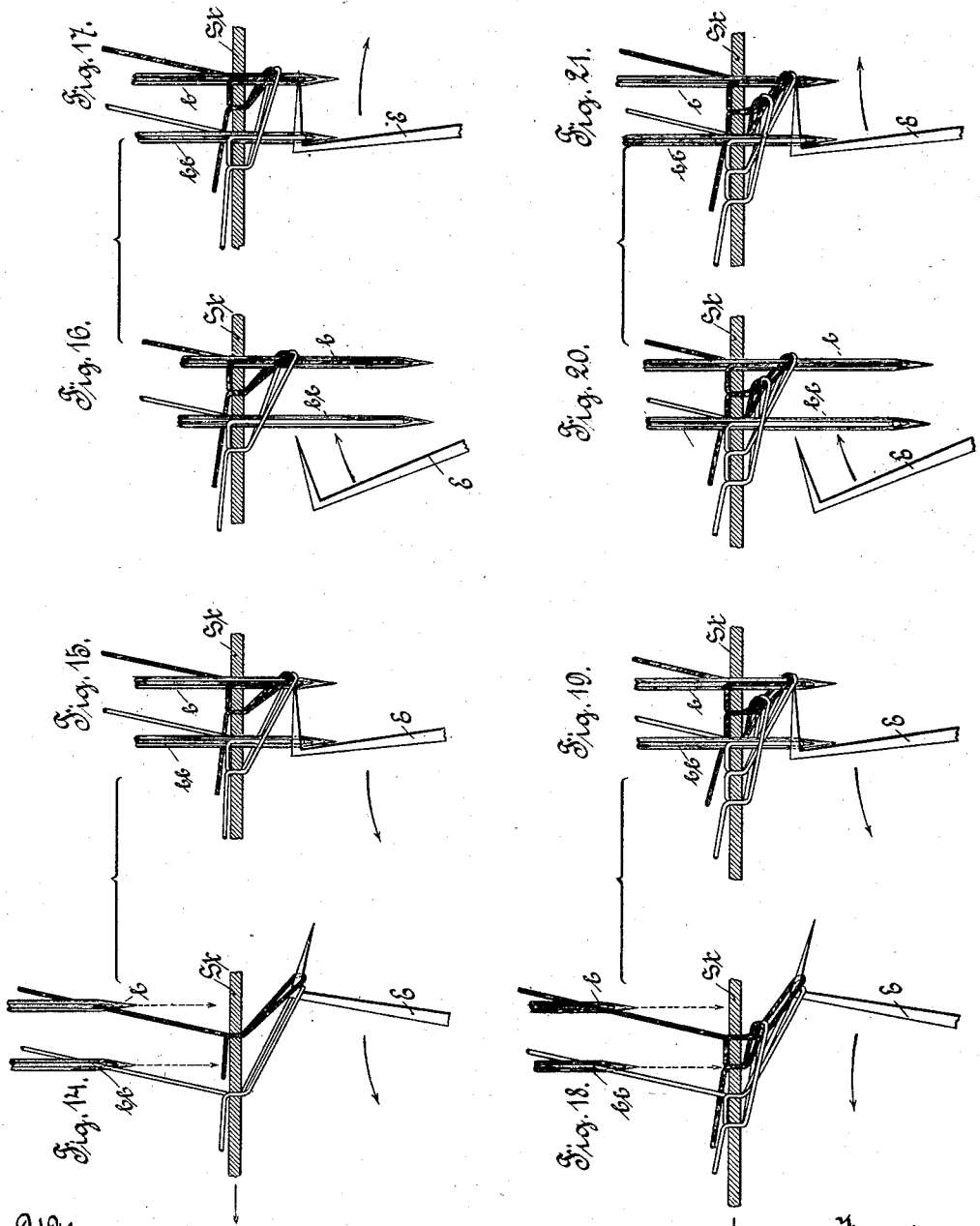

UNITED STATES PATENT OFFICE.

PAUL ALFRED KÜHN AND PAUL FRIEDRICH KLUGE, OF BURGSTADT, GERMANY.

MULTIPLE-SEWING MACHINE.

SPECIFICATION forming part of Letters Patent No. 609,887, dated August 30, 1898.

Application filed August 20, 1896. Serial No. 603,366. (No model.) Patented in Germany February 21, 1896, No. 88,800, and in England August 14, 1896, No. 18,041.

*To all whom it may concern:*

Be it known that we, PAUL ALFRED KÜHN and PAUL FRIEDRICH KLUGE, subjects of the Emperor of Germany, residing at Burgstadt, Saxony, Germany, have invented certain new and useful Improvements in or Relating to Multiple-Sewing Machines, (for which we have obtained Letters Patent in Great Britain, No. 18,041, dated August 14, 1896, and in Germany, No. 88,800, dated February 21, 1896,) of which the following is a specification.

This invention relates to that class of chain-stitch sewing-machines which by means of two or more needles (arranged on the same needle-bar) and swinging loop-takers are mainly destined to be used for producing three divergent seams or rows of stitches on the backs of gloves, which seams hitherto have been produced singly one after the other. Each set of parts necessary for producing one row of stitches, comprising a needle-bar with two or more needles, presser, feeder, and loop-taker, (together with their respective operating mechanism,) is arranged for the above-mentioned purpose in one or more duplicate sets. In the first case both sets may be movable. In the second one (central) set is movable only in the ordinary vertical direction and the others are movable relatively to the stitches produced by the central set. This movement may be effected for producing divergent seams during the working either by hand (preferably for curved seams) or mechanically, (preferably for divergent but staight seams.)

The invention consists in certain novel combinations and arrangements of parts and details of construction as described and claimed herein.

In the drawings is represented a machine with three sets of parts—the central "fixed" set (movable only in a vertical direction) and the two outer sets movable in opposite lateral directions.

Figure 4:
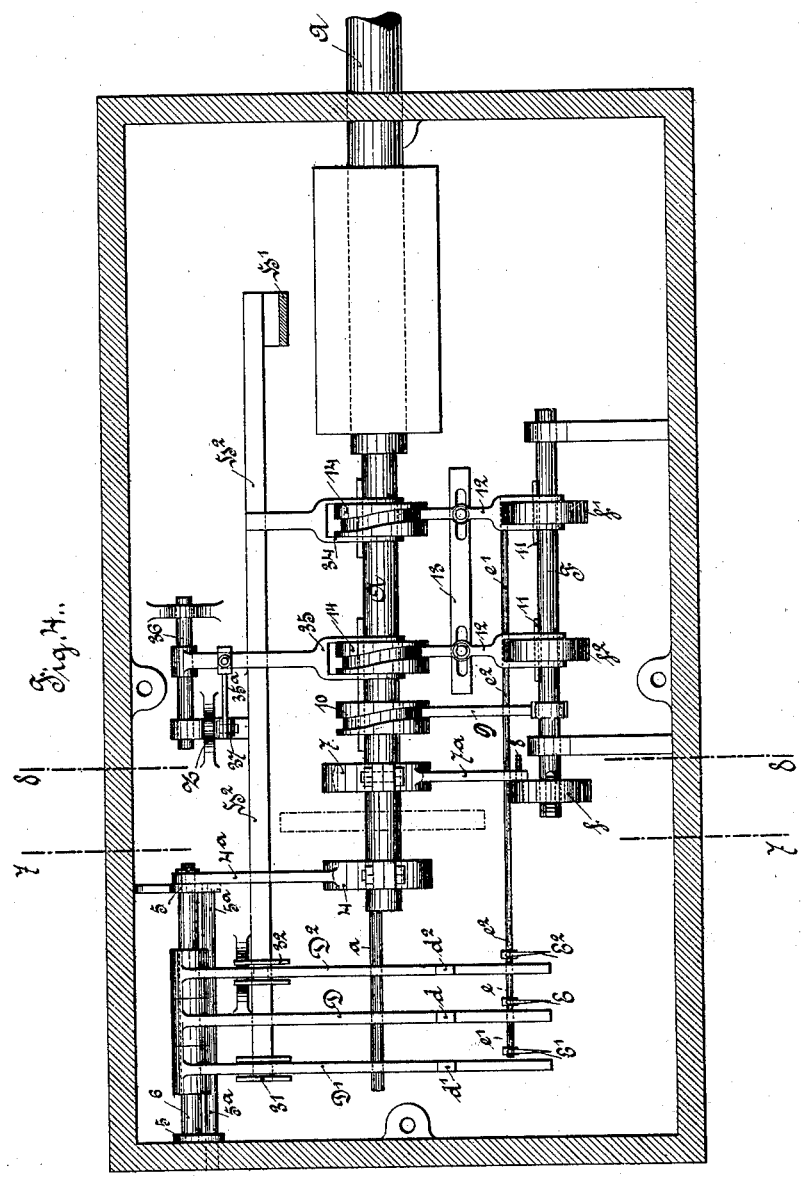
Figure 5:
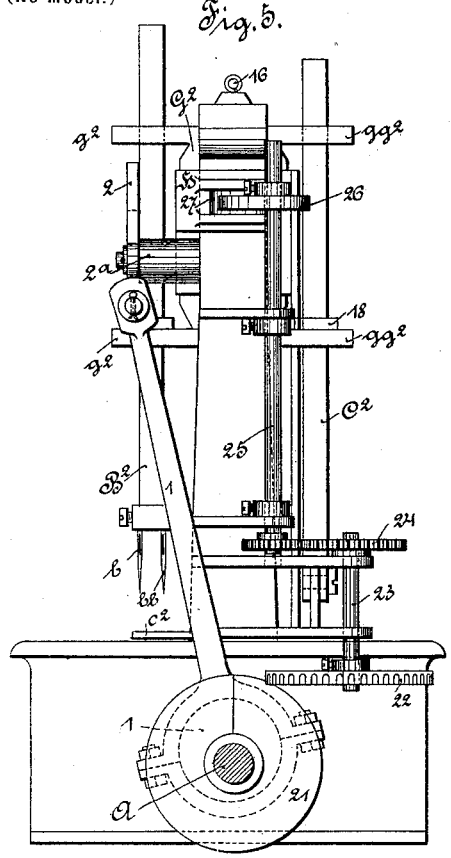
Figure 6:
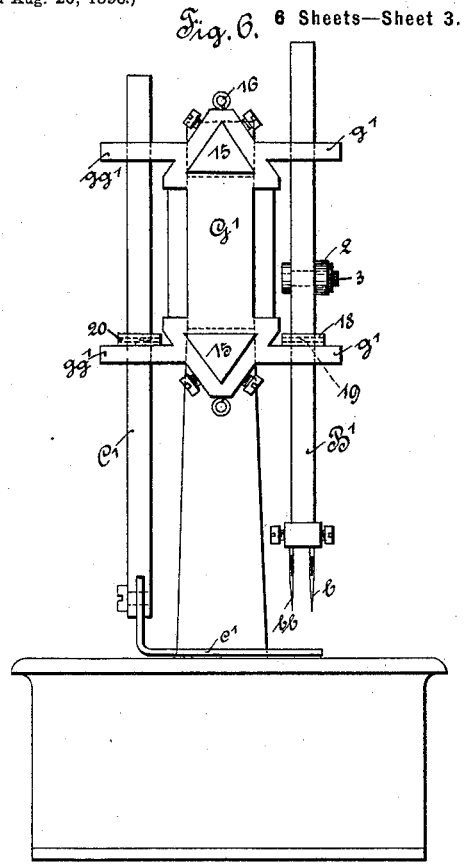
Figure 7:
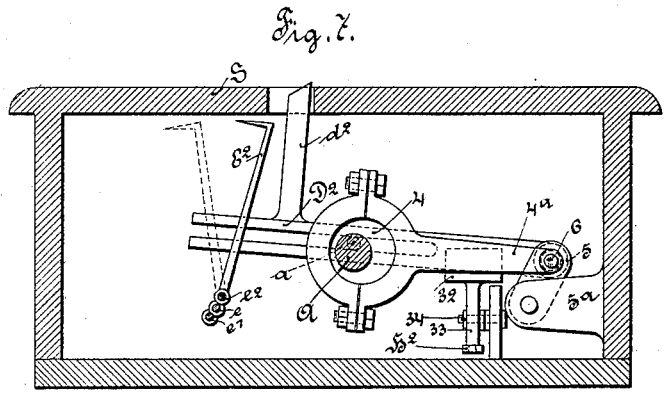
Figure 7A:
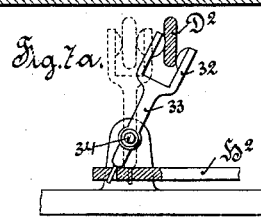
Figure 12:
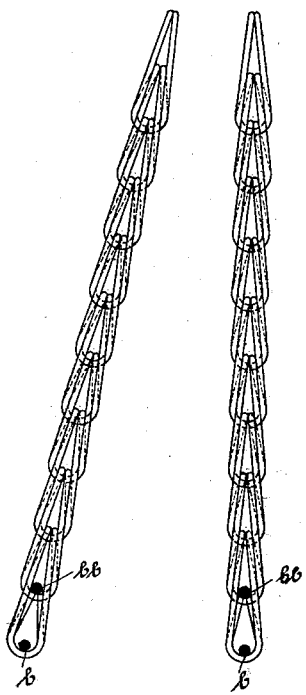
Figure 13:
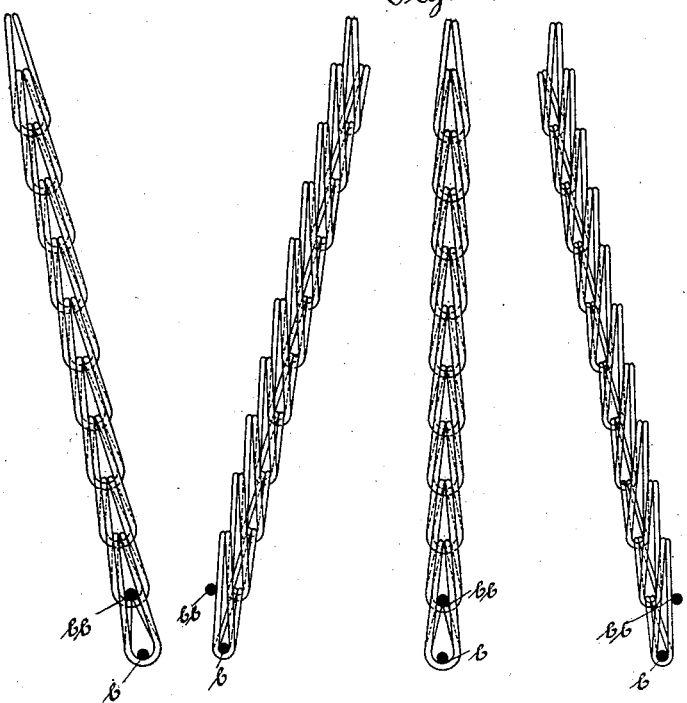
Figure 11:
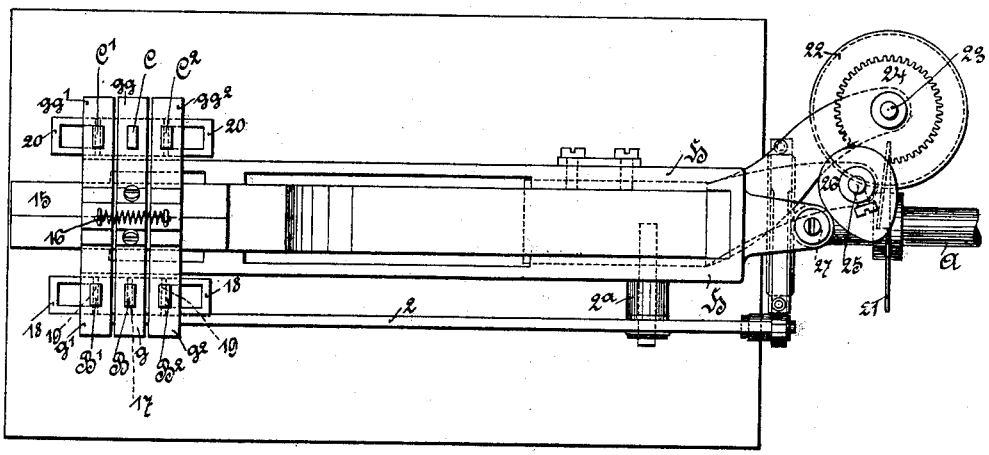

Figure 1 is a side elevation, the slide for moving the movable sets of parts being shown partially broken; Fig. 2, a side elevation, and Fig. 3, a plan of the upper part of said slide. Fig. 4 is a horizontal section on the line 4 4 of Fig. 1 on an enlarged scale. Figs. 5 and 6 are respectively front views according to Fig. 1, seen from the right and left hand sides, respectively. Figs. 7 and 8 are transverse sections through the lower box-shaped part of the frame, with the mechanism contained therein, taken on the lines 7 7 and 8 8 of Fig. 4 and to the same scale. Figs. 9 and 10 show the head, omitting certain parts, in side elevation, as in Fig. 1, and in front view, as in Fig. 6, on a larger scale. Fig. 11 is a plan of the whole machine, according to Fig. 1. Fig. $7^a$ is a detail of the mechanism for moving the looper $D^2$ transversely. Figs. 12 and 13 show examples of ornamental stitches produced by two needles, and Figs. 14 to 21 show the formation of the stitches.

Such parts as are generally found in machines of a similar kind and form no part of the invention—such as the frame, fly-wheel or driving-disk, spindles for the spools, parts for guiding the threads, and so on—are left out of the drawings for the sake of clearness.

The manner of forming the stitch illustrated in Figs. 14 to 21 is well known, but may, however, be briefly described. For the better illustration one of the most ordinary forms of stitch, Fig. 12, is chosen. Only the formation of one stitch, and therefore the coöperation of one pair of needles with one loop-taker, will be described, the manner of working of all the three sets as regards the formation of the stitch being identical. The two needles $b$ and $b\ b$—for instance, of the central fixed set producing the central row of stitches in Fig. 12—are arranged one behind the other in the direction of the stitch and are mounted on the same needle-bar B, Fig. 1. E is the hook-shaped loop-taker, which, besides its oscillatory movement, makes a small reciprocating movement (at right angles to the plane common to both needles) for the purpose of avoiding in the return—for instance, as in Fig. 15—the descending needles. $s\ t$ is the fabric to be stitched or ornamented. In Fig. 14 the needles are shown in the highest position, and E in its farthest right-hand end position. $s\ t$ is moved forward by the feeder in the direction of the arrow the length of one stitch. $b$ and $b\ b$ descend and pass through the two loops of thread (from the previous stitch) held by E, while E, being in front of the needles, moves backward, Fig. 15. In Fig. 16, $b$ and $b\ b$ are shown in their deepest position and E in its end position on the left-hand side. Immediately afterward $b$ and $b\ b$ again rise. E, still being in front of the needles travels to the right-hand side. In this movement the hook of E, Fig. 17, engages between the needles, and the threads, drawn down by the latter, take up the loops and pull them forward, Fig. 18, the positions corresponding to Fig. 14. E in this movement comes into the path of the needles $b$ and $b\ b$ in order to hold the loops within reach of the needles in their descent until the engagement takes place. Immediately after that E again moves forward, Fig. 19, and so on. In an exactly similar manner the formation of seams according to Fig. 13 takes place.

In the machine illustrated in the accompanying drawings there are three sets of parts for the formation of each stitch or row of stitches, comprising needle-bars B B' B², loop-takers E E' E², together with corresponding pressers C C' C², and feeders D D' D², the driving mechanism being partly common to all three sets. B C D E belong to the central fixed set. The other parts are divided between the two laterally-movable sets, B' C' D' E' belonging to one set and B² C² D² E² to the other.

The driving-shaft A, Figs. 4, 5, 7, 8, and 11, driven by hand or otherwise, drives the three needle-bars by means of an eccentric and rod 1 and a lever 2, pivoted upon $2^a$, Figs. 1, 5, and 11. The lever 2 engages by means of a bolt 3 directly with the needle-bar B, Figs. 1 and 6. To B is secured by a pin 17 a small frame 18, Figs. 1, 6, and 11, which causes, by means of pins 19, the needle-bars B' B² to participate in its up-and-down movement, but allows them to move laterally. In similar manner the presser-rods C' C² are connected by a small frame 20 in order to enable them to be raised and lowered simultaneously. C' and C², being, however, movable relatively to C $c'$ $c\ c^2$, are the corresponding presser-feet. The raising and lowering of the pressers is effected in the manner usual in the sewing-machines by means of a hand-lever. (Not shown in the drawings.)

In Figs. 1, 6, 9, and 10 the head is shown forked, and the fork-arms 15 form triangular guides. On the latter are mounted guide-blocks G' G G². The central one G is screwed fast, while G' and G², which are pulled toward each other and toward G by springs 16, are adjustable on 15. In the laterally-projecting vertically-perforated lugs $g'$ $g$ $g^2$ are guided the needle-bars, the presser-rods being guided in similar lugs $g\ g'\ g\ g\ g^2$. While, therefore, B' B B² and C' C C² vertically reciprocate in G' G G², B' with C', B² with C² can be moved out relatively to each other by G' or G² against the action of the springs 16.

If there be only two sets or parts, then both may be movable or one may be fixed—$i.\ e.$, not movable laterally like G B C—and the other be movable.

D' D D², Figs. 1, 4, and 7, are the feeders, which, besides an oscillating up-and-down movement, have a reciprocating movement in the same plane. D is fixed. D' and D² are adjustable on a pin 6, Figs. 4 and 7, which is supported by arms 5, pivoted on $5^A$. The rod $4^a$ of the eccentric 4, mounted on A, engages with the pin 6, whereby a reciprocating motion is communicated to the feeders. The slots in D' D D² inclose the eccentric extension $a$ of A, whereby a swinging motion is produced. The feeders engage with the stuff or fabric by means of arms $d'\ d\ d^2$, projecting upward and passing through the plate S.

The hook-shaped loop-takers E' E E², Figs. 1, 4, and 7, are carried by rods $e'\ e\ e^2$, arranged parallel to each other and rigidly connected to the disks $f\ f^2\ f'$, mounted on the shaft F. (See Fig. 8.) An eccentric 7 on A, connected by its rod $7^a$ with the pin 8 of the disk $f$, produces a rocking motion of the shaft F, which is transmitted to the loop-takers as a swinging motion. E $e\ f$, which belong to B, are fixed—that is, have no lateral movement, (except for the small reciprocating motion of the loop-taker for the purpose already described.) $f^2$ and $f'$ are, on the contrary, movable on F, for which purpose the shaft F is provided with feathers 11, which cause the rocking motion of $f^2$ and $f'$, admitting at the same time of the latter being moved.

The reciprocating movement, before referred to, of E $e\ f$ is effected by an arm 9, secured to F, engaging with a cam 10 on the shaft A, Figs. 4 and 8. The adjustable disks $f^2$ and $f'$ are grasped by forked arms 12, which are guided in the slots of a rail 13, Figs. 4 and 8, and engage with the cams 14 on A. The cams 14 14 are movable on feathers on the shaft A, similarly to $f^2$ and $f'$. When, therefore, the disks 14 14 revolve with A, the sets E' $e'\ f'$ and E² $e^2\ f^2$ reciprocate on F. If there are only two sets, then, as already mentioned with relation to needle bars and pressers, both the feeders and loop-takers may be movable on one set, as D. E may be fixed and the other movable.

According to the arrangement described three parallel rows of stitches will be produced under the assumption that the parts belonging to each set—for instance, G' B' C' D' E'—are in a certain position and are maintained in that position during the work. The question now is to move the needle bars and pressers in accordance with the feeders and loop-takers in such a manner as to cause the two outer rows of stitches to diverge in a straight or curved direction. This movement in the machine illustrated takes place automatically during the sewing operation. It is effected by the radially-recessed and partly-bent disk 21 on the shaft A, Figs. 1 and 11, which disk coöperates with the crown 22, so as to form a kind of worm-gear. The edge of 21 engages between the teeth of the crown-wheel 22 without causing the latter to rotate till the bent part turns the wheel to the extent of one tooth. At each complete turn of A, which makes one stitch, therefore, between each two stitches, a further turning of 22 takes place. From the vertical spindle 23 the movement is transmitted by a pair of toothed wheels 24 to the spindle 25 and to its cam 26. The latter acts on a roller 27, and thereby causes the branched slide H to move gradually forward. H is guided on the frame in a suitable manner. The upper horizontal arm of the slide (see especially Figs. 2 and 3) is bifurcated and incloses the frame arm and head and is directly rigidly connected with the front slide piece or block G' by screws, Fig. 9. G' participates, therefore, in the movement of the slide toward the left, Fig. 1. At the same time (in production of symmetrical patterns, as in Figs. 12 and 13) $G^2$ must be moved toward the right-hand side. For this purpose the lower end of the lever 29, Figs. 9 and 10, is pivotally connected to the slide H by means of a pin 28, said lever being pivoted on the fixed block G and having its upper end connected by a hinged link 30 to the slide $G^2$. The parts 28 30 are preferably in duplicate—that is to say, one set on each side of the frame-head, as shown in Fig. 10.

From the upper arm H of the slide there extends downward a part H'. (Shown in Figs. 1 and 2 partly broken off, in Fig. 5 up to the frame-plate, in Fig. 8 in its lower part, and in Fig. 4 in cross-section.) It effects a rigid connection between H and the lower bar $H^2$ of the slide guided in the box-shaped part of the frame. This bar engages by its fork 31, Fig. 4, the feeder D', which is thus moved to the left-hand side similarly to G' B' C'. The feeder $D^2$ is engaged by a fork 32, which is arranged on the upper arm of a lever 33. The latter is pivoted at 34, Figs. 7 and $7^a$, and its downwardly-extending arm is provided with a pin entering into a slot in the bar $H^2$. The surfaces of the fork 32, facing each other and receiving between them the feeder $D^2$, are shaped in such manner (see Fig. $7^a$) as to allow of up-and-down movement of $D^2$ even when the lever is in an inclined position. When the slide H H' $H^2$ passes to the left, the feeder $D^2$ will be moved to the right with the parts $G^2$ $B^2$ $C^2$.

In order to cause the loop-taker mechanism E' e' f' to move to the left in accordance with G' B' C' and allow at the same time reciprocating movement of said mechanism, the corresponding cam 14 on the shaft A is surrounded by the fork 34 of $K^2$, Fig. 4. A second fork 35, Figs. 4 and 8, guided in a straight line by its end moving on a pin 36, engages with the cam 14 on shaft A, which operates the parts $E^2$ $e^2$ $f^2$.

A lever 37 is connected to 35, which lever is pivoted at 38 on the part Z of the frame and the lower arm of which is hinged to $H^2$ at 39, Fig. 8. The movement of the slide H H' $H^2$ to the left thus produces in the loop-taker mechanism $E^2$ $e^2$ $f^2$ a movement to the right, corresponding with the parts $G^2$ $B^2$ $C^2$. In this manner the movable sets of parts are after each stitch moved away from the middle fixed sets, and divergent straight rows of stitches of equal length, as in Figs. 12 and 13, are produced. When, however, a cam 26 of correspondingly-altered form is used, curved rows of stitches can be produced. The rows of stitches need not be divergent. For instance, by means of a cam-disk with a wavy edge (which alternately moves the movable sets away from and toward each other) substantially parallel but wavy seams can be produced. If it is desired to produce irregular ornamental lines, then the slide H H' $H^2$ may be also moved by hand. Also other means than those herein described may be used for operating the sets of parts and the chief parts.

The number of needles on each needle-bar may vary, and also the number of sets of parts may be any desired.

We claim—

1. In a sewing-machine the combination with reciprocating needle-bars and the corresponding coöperating loopers, of connected slides with connections between said slides and one of the needle-bars and loopers respectively to move the same laterally in unison therewith and centrally-pivoted reversing-levers each connected at one of their ends with one of the slides and at their opposite ends with the other needle-bar and looper respectively, whereby when the slides are moved in one direction one set of needle-bars and loopers will be moved in the same direction therewith and the other set of needle-bars and loopers will be moved in the opposite direction to produce diverging or converging lines of stitches; substantially as described.

2. In a sewing-machine, the combination with reciprocating needle-bars, of independently laterally movable feeders, an oscillating shaft for moving said feeders to feed the goods to be operated upon, independently laterally movable loopers, an oscillating shaft for moving said loopers, a main drive-shaft, a slide with connections between said slide and one of said needle-bars, one of said feeders and one of said loopers, for moving the same in unison with the slide, centrally-pivoted reversing-levers, interposed between said slide and another of said needle-bars loopers and feeders respectively, whereby when said slide is moved in one direction, each set of needle-bars loopers and feeders will move toward or away from the other set of needle-bars loopers and feeders, and a cam on the main drive-shaft for reciprocating said slide; substantially as described.

3. In a sewing-machine, the combination with independently laterally movable reciprocating needle-bars and independently laterally movable loopers for coöperating therewith, of a slide with connections between said slide and said needle-bars and loopers for moving the needle-bars and loopers in pairs in opposite directions simultaneously to produce divergent or convergent lines of stitches, a main drive-shaft with connections between said main drive-shaft and needle-bars for reciprocating the same and an intermittingly-operating cam driven by said main drive-shaft and coöperating with said slide to move the same together with the needle-bars and loopers when the needle-bars are raised; substantially as described.

In testimony whereof we have hereto set our hands in the presence of the two subscribing witnesses.

PAUL ALFRED KÜHN.
  PAUL FRIEDRICH KLUGE.

Witnesses:
 WILHELM HIRESCH,
 ANTON KÖHLER.